(12) United States Patent
Otani

(10) Patent No.: US 7,835,096 B2
(45) Date of Patent: Nov. 16, 2010

(54) DISK-DRIVE WRITE HEAD FAULT DETECTION

(75) Inventor: Daijiro Otani, Nerima-Ku (JP)

(73) Assignee: Texas Instuments Incorporated, Dallas, TX (US)

( * ) Notice: Subject to any disclaimer, the term of this patent is extended or adjusted under 35 U.S.C. 154(b) by 211 days.

(21) Appl. No.: 12/267,964

(22) Filed: Nov. 10, 2008

(65) Prior Publication Data

US 2010/0122118 A1    May 13, 2010

(51) Int. Cl.
    *G11B 27/36* (2006.01)
(52) U.S. Cl. .............................. 360/31; 360/68; 360/46
(58) Field of Classification Search ........................ None
    See application file for complete search history.

(56) References Cited

U.S. PATENT DOCUMENTS

| | | | |
|---|---|---|---|
| 5,592,097 A * | 1/1997 | Shimizu et al. ............. | 324/546 |
| 6,424,475 B1 * | 7/2002 | Bhandari et al. .............. | 360/31 |
| 6,775,078 B2 * | 8/2004 | Jiang ............................ | 360/46 |
| 6,794,880 B2 * | 9/2004 | Tucker ........................ | 324/511 |
| 6,952,316 B2 * | 10/2005 | Tretter ........................... | 360/31 |
| 7,057,839 B2 * | 6/2006 | Shikuma et al. ............... | 360/67 |

\* cited by examiner

*Primary Examiner*—Jason C Olson
(74) *Attorney, Agent, or Firm*—Dawn V. Stephens; Wade James Brady, III; Frederick J. Telecky, Jr.

(57) ABSTRACT

One embodiment of the invention includes a disk-drive write head fault detection system. The system includes an output stage configured to generate a monitored current through the disk-drive write head. The system also includes an open-circuit fault detector configured to compare a magnitude of a first reference current with a magnitude of the monitored current to detect an open-circuit fault condition associated with the disk-drive write head. The system further includes a short-to-ground fault detector configured to compare a magnitude of a second reference current with the magnitude of the monitored current to detect a short-to-ground fault condition associated with the disk-drive write head.

20 Claims, 2 Drawing Sheets

DISK-DRIVE WRITE HEAD FAULT DETECTION

TECHNICAL FIELD

This invention relates to electronic circuits, and more particularly to a disk-drive fault detection.

BACKGROUND

As computer hardware and software technology continues to progress, the need for larger and faster mass storage devices for storing computer software and data continues to increase. Electronic databases and computer applications such as multimedia applications require large amounts of disk storage space. To meet these ever increasing demands, the hard disk-drive (HDD) continues to evolve and advance. In general, mass storage devices and systems, such as HDDs, include a magnetic storage media, such as rotating disks or platters, a spindle motor, read/write heads, an actuator, a pre-amplifier, a read channel, a write channel, a servo controller, a memory, and control circuitry to control the operation of the HDD and to properly interface the HDD to a host or system bus. The read channel, write channel, servo controller, and memory may all be implemented as one integrated circuit that is referred to as a data channel. The control circuitry often includes a microprocessor for executing control programs or instructions during the operation of the HDD.

The operation of an HDD writing data onto the magnetic disk can be interrupted, or the HDD itself can be damaged, based on fault operations that can occur with respect to the disk-drive write head. For example, one or more of the leads can be disconnected, resulting in an open-circuit fault condition such that no current can flow through the disk-drive write head. As another example, the leads or one or more of the components of the disk-drive write head can be shorted to the housing of the disk-drive write head, such that it becomes shorted to ground. Typical preamplifier systems can include fault detection circuitry to indicate the occurrence of the fault conditions to an associated computer system or user. However, such fault detection circuitry can often consume significant amounts of current, such as approximately 9 mW.

SUMMARY

One embodiment of the invention includes a disk-drive write head fault detection system. The system includes an output stage configured to generate a monitored current through the disk-drive write head. The system also includes an open-circuit fault detector configured to compare a magnitude of a first reference current with a magnitude of the monitored current to detect an open-circuit fault condition associated with the disk-drive write head. The system further includes a short-to-ground fault detector configured to compare a magnitude of a second reference current with the magnitude of the monitored current to detect a short-to-ground fault condition associated with the disk-drive write head.

Another embodiment of the invention includes a method for detecting at least one of an open-circuit fault condition and a short-to-ground fault condition associated with a disk-drive write head. The method includes generating a monitored current from a high voltage rail through the disk-drive write head to ground. The method also includes mirroring the monitored current to an open-circuit fault detector to generate a first reference current through the open-circuit fault detector and mirroring the monitored current to a short-to-ground fault detector to generate a second reference current through the short-to-ground fault detector. The method further includes comparing a magnitude of the monitored current with a magnitude of the first reference current to determine an occurrence of the open-circuit fault condition and comparing the magnitude of the monitored current with a magnitude of the second reference current to determine an occurrence of the short-to-ground fault condition.

Another embodiment of the invention includes a disk-drive write head fault detection system. The system includes means for generating a monitored current from a high voltage rail through the disk-drive write head to ground. The system also includes means for setting a first voltage at a first fault detection node that varies with the magnitude of the monitored current and means for indicating an open-circuit fault condition associated with a disk-drive write head in response to the magnitude of the first voltage reducing below a first predetermined threshold. The system further includes means for setting a second voltage at a second fault detection node that varies with the magnitude of the monitored current and means for indicating a short-to-ground fault condition associated with the disk-drive write head in response to the magnitude of the second voltage increasing above a second predetermined threshold.

DETAILED DESCRIPTION

The invention relates to electronic circuits, and more particularly to a disk-drive fault detection. The fault detection system includes an output stage, an open-circuit fault detector, and a short-to-ground fault detector. The output stage is configured to generate a monitored current that flows through the disk-drive write head in response to a bias voltage that controls a current source. The monitored current is mirrored to the open-circuit fault detector and the short-to-ground fault detector as a first reference current and a second reference current. Therefore, the open-circuit fault detector and the short-to-ground fault detector operate as current comparators to compare the magnitude of the monitored current with the magnitudes of the first and second reference currents, respectively. Accordingly, changes in the magnitude of the monitored current can be indicative of either an open-circuit fault condition or a short-to-ground fault condition associated with the disk-drive write head.

As an example, the current-mirror transistors in each of the open-circuit and short-to-ground fault detectors can set a voltage at a respective fault detection node. Thus, the voltages at the respective fault detection nodes can vary in response to changes in the magnitude of the monitored current. Upon the magnitude of the monitored current decreasing, such as in response to an open-circuit fault condition of the disk-drive write head, the voltage in the fault detection node of the open-circuit fault detector can likewise decrease. In response to the voltage in the fault detection node of the open-circuit fault detector decreasing below a predetermined threshold, the open-circuit fault detector can generate a signal that is indicative of the open-circuit fault condition.

Similarly, upon the magnitude of the monitored current increasing, such as in response to a short-to-ground fault condition of the disk-drive write head, the voltage in the fault detection node of the short-to-ground fault detector can likewise increase. In response to the voltage in the fault detection node of the short-to-ground fault detector increasing above a predetermined threshold, the short-to-ground fault detector can generate a signal that is indicative of the short-to-ground fault condition. The predetermined thresholds can be set by a user, such as based on selecting resistance values for a set of reference resistors.

Figure 1:
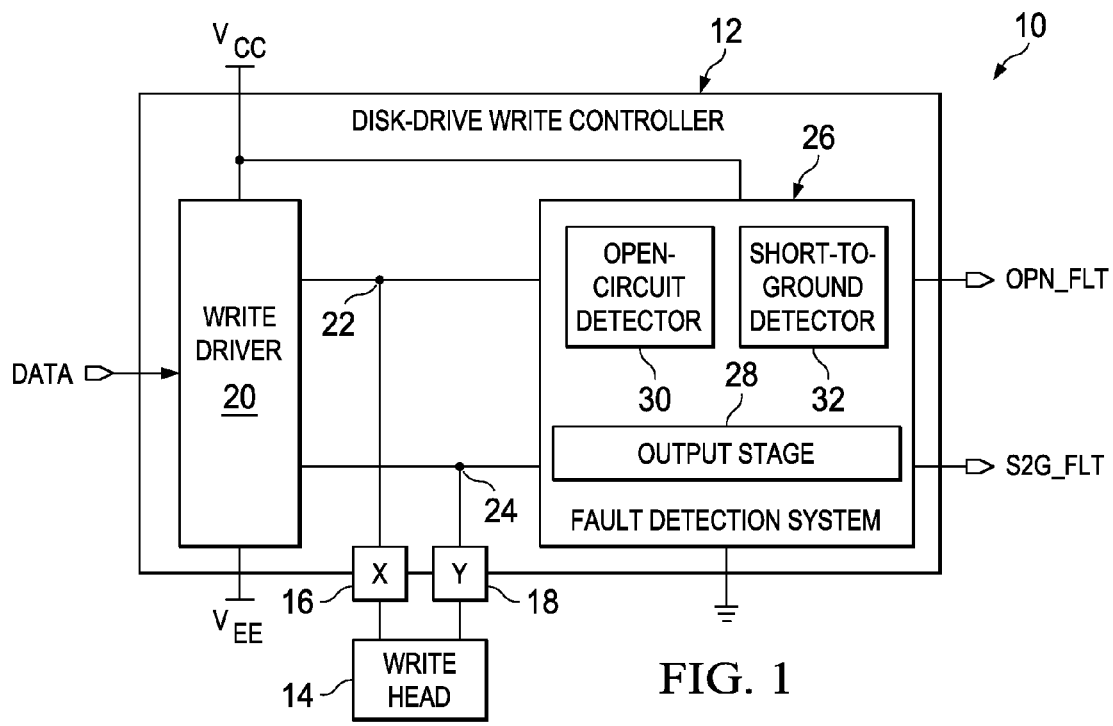
FIG. 1 illustrates an example of a disk-drive write system in accordance with an aspect of the invention.

FIG. 1 illustrates an example of a disk-drive write system 10 in accordance with an aspect of the invention. The disk-drive write system 10 can be included in any of a variety of magnetic disk-drive systems, such as in a preamplifier system. As an example, the disk-drive write system 10 can be implemented in a peripheral device for a personal computer or can be implemented in a hard disk-drive system, such as in a personal computer or enterprise-class server computer. In addition, the disk-drive write system 10 can be implemented as an individual device, or can be implemented as a part of a magnetic disk-drive read/write system configured to both read data from a magnetic disk and write data to the magnetic disk.

The disk-drive write system 10 includes a disk-drive write controller 12 and a disk-drive write head 14. As an example, the disk-drive write head 14 can be an inductive load that is configured to write data onto a magnetic disk (not shown) based on a polarity of current flow through the disk-drive write head 14. The disk-drive write controller 12 and the disk-drive write head 14 are coupled via a first connection terminal 16 and a second connection terminal 18, demonstrated in the example of FIG. 1 as "X" and "Y", respectively. For example, the disk-drive write head 14 can be coupled to the first and second connection terminals 16 and 18 via a pair of trace line leads having a predetermined resistance, as demonstrated in greater detail below.

The disk-drive write controller 12 includes a write driver 20 that is interconnected between a high rail voltage $V_{CC}$ and low rail voltage $V_{EE}$. For example, the high rail voltage $V_{CC}$ can have a magnitude of approximately 5 volts and the low rail voltage $V_{EE}$ can have a magnitude of approximately −5 volts. The write driver 20 is coupled to the first connection terminal 16 at a first node 22 and to the second connection terminal 18 at a second node 24. As an example, the write driver 20 is configured to generate electrical signals on the first and second nodes 22 and 24 to write data onto the magnetic disk via the disk-drive write head 14 based on an input signal DATA. For example, a logic 1 data bit can be written onto the magnetic disk in response to a 5 volt pulse being generated by the write driver 20 and a logic 0 data bit can be written onto the magnetic disk in response to a −5 volt pulse being generated by the write driver 20.

The disk-drive write controller 12 also includes a fault detection system 26. The fault detection system 26 is configured to detect fault conditions associated with the disk-drive write head 14 that could result in failure of the writing of data onto the magnetic disk. For example, an open-circuit fault condition can occur in response to one of the trace line leads being disconnected from one of the first and second connection terminals 16 and 18 or from the disk-drive write head 14. Therefore, an open-circuit forms between the first and second connection terminals 16 and 18. As another example, a short-to-ground fault condition can occur in response to one of the trace line leads or the disk-drive write head 14 being coupled to ground, such as based on a short-circuit to the housing of the disk-drive write head 14.

The fault detection system 26 includes an output stage 28, an open-circuit detector 30, and a short-to-ground detector 32. The output stage 28 is configured as an interface for the fault detection system 26 and the disk-drive write head 14, such that the output stage 28 can be coupled to the first and second connection terminals 16 and 18 via the nodes 22 and 24. As an example, the output stage 28 can be configured to generate a monitored current through the disk-drive write head 14. The monitored current can change in magnitude based on the occurrence of a fault condition, such as the open-circuit fault condition and the short-to-ground fault condition.

The open-circuit detector 30 and the short-to-ground detector 32 can each cooperate with the output stage 28 to detect the occurrences of the open-circuit fault condition and the short-to-ground fault condition, respectively. As an example, each of the open-circuit detector 30 and the short-to-ground detector 32 can be configured to generate a reference current based on the monitored current and to compare the respective reference current with the monitored current. Upon a change in magnitude of the monitored current beyond a predetermined threshold, the respective one of the open-circuit detector 30 and the short-to-ground detector 32 can indicate the respective fault condition. For example, upon the monitored current decreasing beyond a predetermined threshold, the open-circuit detector 30 can assert a signal OPN_FLT to indicate that the open-circuit fault condition has occurred. Similarly, upon the monitored current increasing beyond a predetermined threshold, the short-to-ground detector 32 can assert a signal S2G_FLT to indicate that the short-to-ground fault condition has occurred. Accordingly, a processor or other computing component can perform an appropriate action in response to receiving the fault indication, such as interrupting the write operation and/or disabling the disk-drive write system 10.

As demonstrated in the example of FIG. 1, the fault detection system 26 is demonstrated as interconnected between the high rail voltage $V_{CC}$ and ground. As an example, the currents that are generated in the output stage 28, the open-circuit detector 30, and the short-to-ground detector 32 are conducted from the high rail voltage $V_{CC}$ to ground. Therefore, the fault detection system 26 is powered by a voltage potential that is less than the write driver 20 which interconnects the high rail voltage $V_{CC}$ and the low rail voltage $V_{EE}$. As an example, the fault detection system 26 can be powered by 5 volts between the high rail voltage $V_{CC}$ and ground instead of the 10 volts between the high rail voltage $V_{CC}$ and the low rail voltage $V_{EE}$. Therefore, the fault detection system 26 can consume substantially less power than typical fault detection systems that operate between a high voltage rail and a low voltage rail having a voltage magnitude that is less than zero. For example, the fault detection system 26 can consume approximately 3.5 mW, as opposed to approximately 9 mW consumed by typical fault detection systems.

It is to be understood that each of the fault detection system 26 and the write driver 20 can be configured to not interfere with the respective operations of each other. As an example, the write driver 20 can be configured to have a high-impedance output. As another example, the time of operation of each of the write driver 20 and the fault detection system 26 can be mutual exclusive with respect to each other. In addition, it is to be understood that the disk-drive write system 10 is not intended to be limited to the example of FIG. 1. For example, the write driver 20 and the fault detection system 26 can be configured as or included in separate devices instead of being configured together in the disk-drive write controller 12. As another example, the disk-drive write controller 12 could be configured along with a disk-drive read controller, such that the disk-drive write head 14 can likewise be configured along with a disk-drive read head. Furthermore, it is to be understood that the write driver 20 has been demonstrated in the example of FIG. 1 and described above simplistically, such that additional components and functionality have been omitted in the description of the write driver 20. Therefore, the disk-drive write system 10 can be configured in any of a variety of ways.

Figure 2:
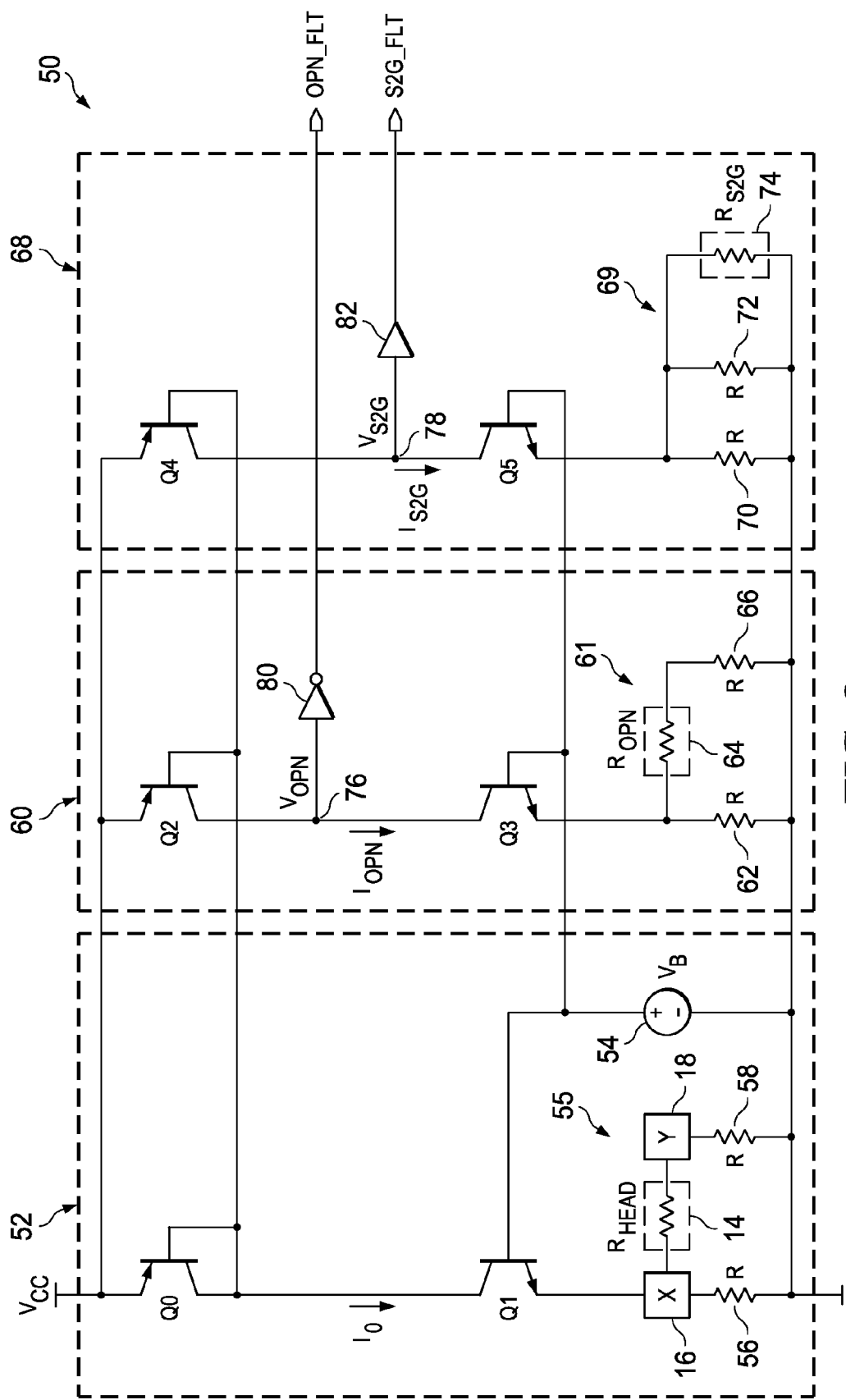
FIG. 2 illustrates an example of a fault detection system in accordance with an aspect of the invention.

FIG. 2 illustrates an example of a fault detection system 50 in accordance with an aspect of the invention. As an example, the fault detection system 50 can correspond to the fault detection system 26 in the example of FIG. 1. Therefore, reference is to be made to the example of FIG. 1 in the following description of the example of FIG. 2.

The fault detection system 50 includes an output stage 52. The output stage 52 includes a PNP-type bipolar junction transistor (BJT) Q0 and an NPN-type BJT Q1. The base of the transistor Q0 is coupled to its collector. A bias voltage source 54 provides a bias voltage $V_B$ to the base of the transistor Q1 to bias the transistor Q1, thus activating the transistor Q1 and the transistor Q0 based on the base and collector of the transistor Q0 being coupled. Therefore, a monitored current $I_0$ is conducted from the positive rail voltage $V_{CC}$ through both the transistors Q0 and Q1. The monitored current $I_0$ is also conducted through an arrangement of resistors 55 that includes a resistance $R_{HEAD}$ that is associated with the disk-drive write head 14. Specifically, a first portion of the monitored current $I_0$ is conducted through a first resistor 56 having a resistance magnitude of R to ground. A second portion of the monitored current $I_0$ is conducted from the disk-drive write controller 12 via the first connection terminal 16, through the disk-drive write head 14 having a resistance magnitude of $R_{HEAD}$, back into the disk-drive write controller 12 via the second connection terminal 18, and through another resistor 58 having the resistance magnitude of R to ground. Therefore, the first resistor 56 is arranged in parallel with a series connection of the resistor $R_{HEAD}$ that is representative of the disk-drive write head 14 and the second resistor 58. The resistance magnitude R can be significantly greater than the resistance magnitude $R_{HEAD}$ of the disk-drive write head 14. As an example, the resistance magnitude R can be approximately 10 kΩ, while the resistance magnitude $R_{HEAD}$ of the disk-drive write head 14 can be approximately 5Ω.

The fault detection system 50 also includes an open-circuit detector 60. The open-circuit detector 60 includes a PNP-type BJT Q2 and an NPN-type BJT Q3. The bias voltage source 54 provides the bias voltage $V_B$ to the base of the transistor Q3 to bias the transistor Q3. The base of the transistor Q2 is coupled to the base of the transistor Q0. Therefore, the transistor Q0 mirrors the monitored current $I_0$ through the transistor Q2 as a first reference current $I_{OPN}$ that is conducted from the positive rail voltage $V_{CC}$ through both the transistors Q2 and Q3. The first reference current $I_{OPN}$ is also conducted through an arrangement of resistors 61. Specifically, a first portion of the first reference current $I_{OPN}$ is conducted through a third resistor 62 having the resistance magnitude of R to ground. A second portion of the first reference current $I_{OPN}$ is conducted through a fourth resistor 64 having a resistance magnitude $R_{OPN}$ and through a fifth resistor 66 having the resistance magnitude of R to ground. Therefore, the third resistor 62 is arranged in parallel with a series connection of the fourth resistor 64 and the fifth resistor 66.

The fault detection system 50 also includes a short-to-ground detector 68. The short-to-ground detector 68 includes a PNP-type BJT Q4 and an NPN-type BJT Q5. The bias voltage source 54 provides the bias voltage $V_B$ to the base of the transistor Q5 to bias the transistor Q5. The base of the transistor Q4 is coupled to the base of the transistor Q0. Therefore, the transistor Q0 mirrors the monitored current $I_0$ through the transistor Q4 as a second reference current $I_{S2G}$ that is conducted from the positive rail voltage $V_{CC}$ through both the transistors Q4 and Q5. The first reference current $I_{S2G}$ is also conducted through an arrangement of resistors 69. Specifically, a first portion of the second reference current $I_{S2G}$ is conducted through a sixth resistor 70 having the resistance magnitude of R to ground and a second portion of the second reference current $I_{S2G}$ is conducted through a seventh resistor 72 having the resistance magnitude of R. A third portion of the second reference current $I_{S2G}$ is conducted through an eighth resistor 74 having a resistance magnitude $R_{S2G}$ to ground. Therefore, the sixth resistor 70, the seventh resistor 72, and the eighth resistor 74 are each arranged in parallel with respect to each other.

Each of the open-circuit detector 60 and the short-to-ground detector 68 are configured to compare a magnitude of the monitored current $I_0$ with a magnitude of the first and second reference currents $I_{OPN}$ and $I_{S2G}$, respectively, to determine the occurrence of the respective one of the open-circuit and short-to-ground fault conditions. Specifically, the biasing of the transistor Q3 by the voltage $V_B$ and the arrangement of resistors 61 sets a magnitude of the first reference current $I_{OPN}$ in a non-fault condition as a threshold for indication of an open-circuit fault condition. Similarly, the biasing of the transistor Q5 by the voltage $V_B$ and the arrangement of resistors 69 sets a magnitude of the second reference current $I_{S2G}$ in a non-fault condition as a threshold for indication of a short-to-ground fault condition.

The open-circuit detector 60 includes an open-circuit fault detection node 76 having a voltage $V_{OPN}$ that changes in response to the occurrence of the open-circuit fault condition. Similarly, the short-to-ground detector 68 includes a short-to-ground fault detection node 78 having a voltage $V_{S2G}$ that changes in response to the occurrence of the short-to-ground fault condition. Based on the mirroring of the monitored current $I_0$ from the output stage 52 to the open-circuit detector 60 as the first reference current $I_{OPN}$ and to the short-to-ground detector 68 as the second reference current $I_{S2G}$, the changes in the respective voltages $V_{OPN}$ and $V_{S2G}$ occur in response to changes in the magnitude of the monitored current $I_0$. Therefore, the voltages $V_{OPN}$ and $V_{S2G}$ indicate a magnitude of the monitored current $I_0$ relative to the first and second reference currents $I_{OPN}$ and $I_{S2G}$.

As an example, the open-circuit detector 60 is configured such that, in a non-fault condition, a maximum collector current through the transistor Q3 is less than the magnitude of collector current that the transistor Q2 can provide. Therefore, in response, the voltage $V_{OPN}$ is held at an increased magnitude to balance the magnitude of the first reference current $I_{OPN}$ through each of the transistors Q2 and Q3. However, as described above, an open-circuit fault condition occurs when one or both of the trace lead lines between one of the first and second connection terminals 16 and 18 becomes decoupled from the disk-drive write head 14. As a result, an open-circuit develops between the first and second connection terminals 16 and 18. Therefore, the monitored current $I_0$ decreases in response based on the total resistance magnitude of the arrangement of resistors 55 increasing. Specifically, the parallel path formed by the series connection of the disk-drive write head 14 and the resistor 58 is cut off, raising the resistance magnitude of the arrangement of resistors 55 to a magnitude of R.

In response to the increase in resistance magnitude of the arrangement of resistors 55, and thus the decrease of the magnitude of the monitored current $I_0$, the voltage magnitude at the base of the transistors Q0 and Q2 increases. As a result, the magnitude of collector current that can be provided by the transistor Q2 decreases, such as to a magnitude that is less than the maximum collector current that can be conducted through the transistor Q3. Accordingly, the magnitude of the voltage $V_{OPN}$ decreases to maintain a balanced magnitude of the first reference current $I_{OPN}$ through each of the transistors Q2 and Q3. Upon the magnitude of the voltage $V_{OPN}$ decreasing below a predetermined threshold, an inverter 80 switches to assert the signal OPN_FLT at its output. Accordingly, the open-circuit detector 60 indicates the occurrence of the open-circuit fault condition.

As another example, the short-to-ground detector 68 is configured such that, in a non-fault condition, a maximum collector current through the transistor Q5 is greater than the magnitude of collector current that the transistor Q4 can provide. Therefore, in response, the voltage $V_{S2G}$ is held at a decreased magnitude to balance the magnitude of the second reference current $I_{S2G}$ through each of the transistors Q4 and Q5. However, as also described above, a short-to-ground fault condition occurs when one of the trace lead lines or the disk-drive write head 14 itself becomes coupled to ground, such as based on contact with the conductive housing of the disk-drive write head 14. As a result, a short-circuit to ground develops at one of the first and second connection terminals 16 and 18. Therefore, the monitored current $I_0$ increases in response based on the total resistance magnitude of the arrangement of resistors 55 decreasing. Specifically, both of the resistors 56 and 58 and possibly the disk-drive write head 14 itself is bypassed to ground, thus significantly decreasing the resistance magnitude of the arrangement of resistors 55.

In response to the decrease in resistance magnitude of the arrangement of resistors 55, and thus the increase of the magnitude of the monitored current $I_0$, the voltage magnitude at the base of the transistors Q0 and Q4 decreases. As a result, the magnitude of collector current that can be provided by the transistor Q4 increases, such as to a magnitude that is greater than the maximum collector current that can be conducted through the transistor Q5. Accordingly, the magnitude of the voltage $V_{S2G}$ increases to maintain a balanced magnitude of the second reference current $I_{S2G}$ through each of the transistors Q4 and Q5. Upon the magnitude of the voltage $V_{S2G}$ increasing above a predetermined threshold, a buffer 82 switches to assert the signal S2G_FLT at its output. Accordingly, the short-to-ground detector 68 indicates the occurrence of the short-to-ground fault condition.

The predetermined thresholds at which the inverter 80 and the buffer 82 switch based on the voltages $V_{OPN}$ and $V_{S2G}$ can be set in the open-circuit detector 60 and the short-to-ground detector 68, respectively. As an example, the transistors Q0, Q2, and Q4 can have substantially similar current conductive characteristics, as can the transistors Q1, Q3, and Q5. Thus, based on the collective resistance magnitudes of the arrangements of resistors 61 and 69 relative to the collective resistance magnitude of the arrangement of resistors 55, the first reference current $I_{OPN}$ can have a magnitude that is less than the monitored current $I_0$ and the second reference current $I_{S2G}$ can have a magnitude that is greater than the monitored current $I_0$ in the non-fault condition. Therefore, the first and second reference currents $I_{OPN}$ and $I_{S2G}$ can be selected to have magnitudes that are current thresholds with respect to the monitored current $I_0$.

For example, the resistance magnitudes of the resistors 56, 58, 62, 66, 70, and 72 are demonstrated in the example of FIG. 2 as all being approximately equal (i.e., the resistance magnitude R). The resistance magnitude $R_{OPN}$ of the resistor 64 can thus be selected to set an initial magnitude of the first reference current $I_{OPN}$ (i.e., absent the occurrence of the open-circuit and short-to-ground fault conditions) relative to the monitored current $I_0$. Therefore, the resistance magnitude $R_{OPN}$ of the resistor 64 sets the initial magnitude of the voltage $V_{OPN}$, such that the threshold of the first reference current $I_{OPN}$ with respect to the monitored current $I_0$ is resistance referred based on the magnitude of the resistance $R_{OPN}$ of the resistor 64. Accordingly, the resistor 64 can be selected to have a resistance magnitude $R_{OPN}$ that is smaller to increase the sensitivity or that is greater to decrease the sensitivity of the open-circuit detector 60 with respect to detecting the open-circuit fault condition.

As another example, the resistance magnitude $R_{S2G}$ of the resistor 74 can be selected to set an initial magnitude of the second reference current $I_{S2G}$ relative to the monitored current $I_0$. Therefore, the resistance magnitude of the resistor 74 sets the initial magnitude of the voltage $V_{S2G}$, such that the threshold of the second reference current $I_{S2G}$ with respect to the monitored current $I_0$ is resistance referred based on the magnitude of the resistance $R_{S2G}$ of the resistor 74. Accordingly, the resistor 74 can be selected to have a resistance magnitude $R_{S2G}$ that is greater to increase the sensitivity or that is smaller to decrease the sensitivity of the short-to-ground detector 68 with respect to detecting the short-to-ground fault condition. As an example, the resistors 64 and 74 can be internal resistors, such that they have fixed resistance magnitudes $R_{OPN}$ and $R_{S2G}$, respectively. As another example, the resistors 64 and 74 can be configured as external resistors, such that the resistance magnitudes $R_{OPN}$ and $R_{S2G}$, respectively, can be adjusted.

Similar to as described above with respect to the example of FIG. 1, because the monitored current $I_0$ and the first and second reference currents $I_{OPN}$ and $I_{S2G}$ flow to ground instead of flowing to a voltage rail having a magnitude that is less than ground, the fault detection system 50 consumes substantially little power. It is to be understood that the fault detection system 50 is not intended to be limited to the example of FIG. 2. For example, the fault detection system 50 is not limited to the use of BJTs, but could instead include field-effect transistors (FETs). As another example, one or both of the inverter 80 and the buffer 82 could be replaced by a comparator to compare the voltages $V_{OPN}$ and $V_{S2G}$, respectively, with static reference voltages to indicate the occurrence of the open-circuit and short-to-ground fault conditions, respectively. As yet another example, the arrangements of resistors 55, 61, and 69 are not intended to be limited to as demonstrated in the example of FIG. 2, but could include any of a variety of resistor arrangements to set the magnitudes of the monitored current $I_0$ and the first and second reference currents $I_{OPN}$ and $I_{S2G}$. Accordingly, the fault detection system 50 can be configured in any of a variety of ways.

Figure 3:
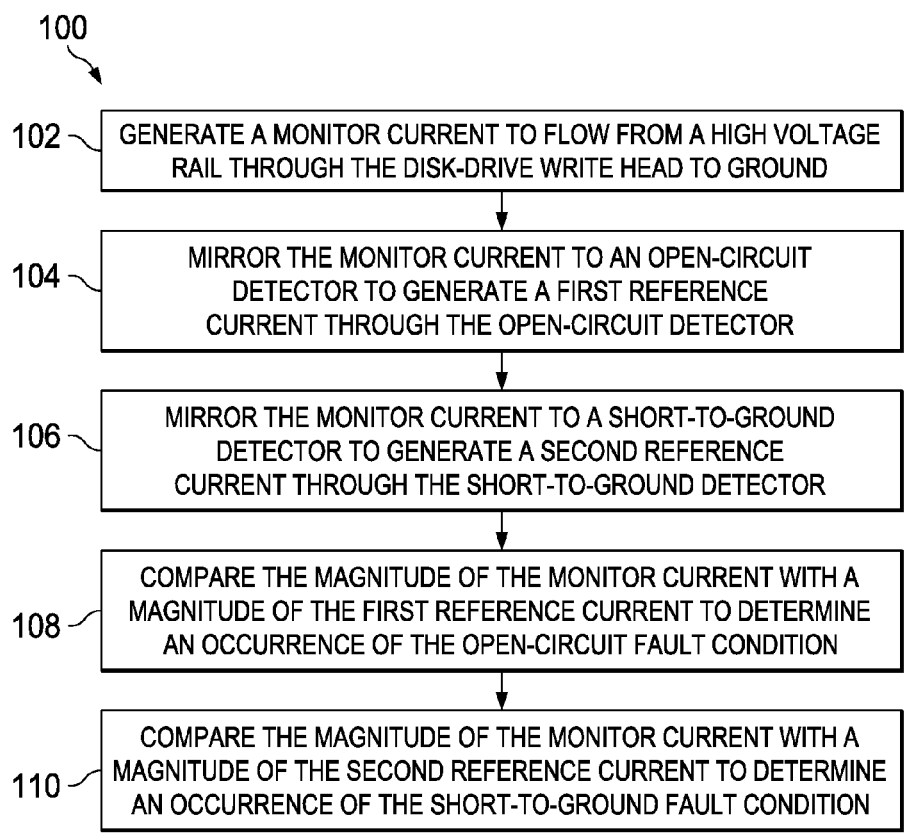
FIG. 3 illustrates an example of a method for detecting at least one of an open-circuit fault condition and a short-to-ground fault condition associated with a disk-drive write head in accordance with an aspect of the invention.

In view of the foregoing structural and functional features described above, certain methods will be better appreciated with reference to FIG. 3. It is to be understood and appreciated that the illustrated actions, in other embodiments, may occur in different orders and/or concurrently with other actions. Moreover, not all illustrated features may be required to implement a method.

FIG. 3 illustrates an example of a method 100 for detecting at least one of an open-circuit fault condition and a short-to-ground fault condition associated with a disk-drive write head in accordance with an aspect of the invention. At 102, a monitored current is generated to flow from a high voltage rail through the disk-drive write head to ground. The monitored current can be generated in an output stage of a fault detection system by biasing a transistor, such as an NPN BJT, to flow through the disk-drive write head and an arrangement of resistors.

At 104, the monitored current is mirrored to an open-circuit detector to generate a first reference current through the open-circuit detector. The mirroring can be via a current mirror for the first reference current to flow through a transistor and an arrangement of resistors in the open-circuit detector. An initial magnitude of the first reference current can be set based on a resistance magnitude of one or more of the resistors in the arrangement of resistors. At 106, the monitored current is mirrored to a short-to-ground detector to generate a second reference current through the short-to-ground detector. The mirroring can be via a current mirror for the second reference current to flow through a transistor and an arrangement of resistors in the short-to-ground detector. An initial magnitude of the second reference current can be set based on a resistance magnitude of one or more of the resistors in the arrangement of resistors.

At 108, the magnitude of the monitored current is compared with a magnitude of the first reference current to determine an occurrence of the open-circuit fault condition. The open-circuit fault condition can be indicated in response to the monitored current decreasing to a magnitude that is less than the first reference current. A voltage at an open-circuit fault detection node through which the first reference current flows can decrease in response to the decrease in the monitored current. The decrease in the magnitude of the voltage can assert an output of an inverter to indicate the open-circuit fault condition. At 110, the magnitude of the monitored current is compared with a magnitude of the second reference current to determine an occurrence of the short-to-ground fault condition. The short-to-ground fault condition can be indicated in response to the monitored current increasing to a magnitude that is greater than the second reference current. A voltage at an short-to-ground fault detection node through which the second reference current flows can increase in response to the increase in the monitored current. The increase in the magnitude of the voltage can assert an output of a buffer to indicate the short-to-ground fault condition.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A disk-drive write head fault detection system comprising:
   an output stage configured to generate a monitored current through the disk-drive write head;
   an open-circuit fault detector configured to compare a magnitude of a first reference current with a magnitude of the monitored current to detect an open-circuit fault condition associated with the disk-drive write head; and
   a short-to-ground fault detector configured to compare a magnitude of a second reference current with the magnitude of the monitored current to detect a short-to-ground fault condition associated with the disk-drive write head.

2. The system of claim 1, wherein the output stage comprises a first resistor and a second resistor each having a first resistance magnitude, the first resistor interconnecting a first output terminal of the disk-drive write head and ground and the second resistor interconnecting a second output terminal of the disk-drive write head and ground, the magnitude of the monitored current being set based on a resistance magnitude of the first resistor in parallel with a series connection of the second resistor and the disk-drive write head having a predetermined resistance magnitude.

3. The system of claim 2, wherein the open-circuit fault detector comprises a third resistor and a fourth resistor each having the first resistance magnitude, the third and fourth resistors interconnecting respective first and second ends of a fifth resistor and ground, the magnitude of the first reference current being set based on a resistance magnitude of the third resistor in parallel with the fourth resistor and the fifth resistor.

4. The system of claim 3, wherein the fifth resistor has a resistance magnitude that is selected to set a threshold of a voltage at an open-circuit fault detection node through which the first reference current flows, the threshold being indicative of the open-circuit fault condition.

5. The system of claim 2, wherein the short-to-ground fault detector comprises a third resistor and a fourth resistor each having the first resistance magnitude, each of the third and fourth resistors interconnecting a first end of a fifth resistor and ground, the magnitude of the second reference current being set based on a resistance magnitude of a parallel connection of the third, fourth, and fifth resistors.

6. The system of claim 5, wherein the fifth resistor has a resistance magnitude that is selected to set a threshold of a voltage at a short-to-ground fault detection node through which the second reference current flows, the threshold being indicative of the short-to-ground fault condition.

7. The system of claim 1, wherein the output stage is configured to generate the monitored current from a high voltage rail through the disk-drive write head to ground.

8. The system of claim 1, wherein the output stage comprises a first current-mirror transistor configured to mirror the monitored current to the open-circuit fault detector as the first reference current via a second current-mirror transistor in the open-circuit fault detector and to the short-to-ground fault detector as the second reference current via a third current-mirror transistor in the short-to-ground fault detector.

9. The system of claim 8, wherein the second current-mirror transistor interconnects a high voltage rail and an open-circuit fault detection node, the open-circuit fault detector being configured to detect the open-circuit fault condition based on a decrease in a voltage magnitude of the open-circuit fault detection node in response to a decrease in the magnitude of the monitored current resulting from the open-circuit fault condition.

10. The system of claim 8, wherein the third current-mirror transistor interconnects a high voltage rail and a short-to-ground fault detection node, the short-to-ground fault detector being configured to detect the short-to-ground fault condition based on an increase in a voltage magnitude of the short-to-ground fault detection node in response to an increase in the magnitude of the monitored current resulting from the short-to-ground fault condition.

11. A method for detecting at least one of an open-circuit fault condition and a short-to-ground fault condition associated with a disk-drive write head, the method comprising:

generating a monitored current from a high voltage rail through the disk-drive write head to ground;

mirroring the monitored current to an open-circuit fault detector to generate a first reference current through the open-circuit fault detector;

mirroring the monitored current to a short-to-ground fault detector to generate a second reference current through the short-to-ground fault detector;

comparing a magnitude of the monitored current with a magnitude of the first reference current to determine an occurrence of the open-circuit fault condition; and comparing the magnitude of the monitored current with a magnitude of the second reference current to determine an occurrence of the short-to-ground fault condition.

12. The method of claim 11, wherein comparing the magnitude of the monitored current with the magnitude of the first reference current comprises monitoring a magnitude of a voltage at a node through which the first reference current flows, the magnitude of the voltage changing in response to changes in the magnitude of the monitored current resulting from the open-circuit fault condition.

13. The method of claim 12, further comprising activating an open-circuit fault indicator signal in response to the magnitude of the voltage reducing below a predetermined threshold that is set based on a resistance magnitude of a resistor through which the first reference current flows.

14. The method of claim 11, wherein comparing the magnitude of the monitored current with the magnitude of the second reference current comprises monitoring a magnitude of a voltage at a node through which the second reference current flows, the magnitude of the voltage changing in response to changes in the magnitude of the monitored current resulting from the short-to-ground fault condition.

15. The method of claim 14, further comprising activating a short-to-ground fault indicator signal in response to the magnitude of the voltage increasing above a predetermined threshold that is set based on a resistance magnitude of a resistor through which the second reference current flows.

16. The method of claim 11, wherein mirroring the monitored current to the open-circuit fault detector comprises conducting the first reference current through an arrangement of at least one resistor having a predetermined resistance magnitude selected to set a threshold for the magnitude of the monitored current that is indicative of the open-circuit fault condition.

17. The method of claim 11, wherein mirroring the monitored current to the short-to-ground fault detector comprises conducting the second reference current through an arrangement of at least one resistor having a predetermined resistance magnitude selected to set a threshold for the magnitude of the monitored current that is indicative of the short-to-ground fault condition.

18. A disk-drive write head fault detection system comprising:

means for generating a monitored current from a high voltage rail through the disk-drive write head to ground;

means for setting a first voltage at a first fault detection node that varies with the magnitude of the monitored current;

means for indicating an open-circuit fault condition associated with a disk-drive write head in response to the magnitude of the first voltage reducing below a first predetermined threshold;

means for setting a second voltage at a second fault detection node that varies with the magnitude of the monitored current; and means for indicating a short-to-ground fault condition associated with the disk-drive write head in response to the magnitude of the second voltage increasing above a second predetermined threshold.

19. The system of claim 18, further comprising:
means for setting the first predetermined threshold; and
means for setting the second predetermined threshold.

20. The system of claim 18, wherein the means for setting the first voltage comprises means for mirroring the monitored current to generate a first reference current that flows through the first fault detection node, and wherein the means for setting the second voltage comprises means for mirroring the monitored current to generate a second reference current that flows through the second fault detection node.

* * * * *